PORTABLE PELLET MILL APPARATUS

Filed Jan. 18, 1962 10 Sheets-Sheet 1

INVENTORS
ARTHUR M. HETH
CARROLL H. BRUUN
BY Braddock and Braddock
ATTORNEYS

PORTABLE PELLET MILL APPARATUS

Filed Jan. 18, 1962 10 Sheets-Sheet 2

INVENTORS
ARTHUR M. HETH
CARROLL H. BRUUN
BY Braddock and Braddock
ATTORNEYS

PORTABLE PELLET MILL APPARATUS

INVENTORS
ARTHUR M. HETH
CARROLL H. BRUUN
BY Braddock and Braddock
ATTORNEYS

PORTABLE PELLET MILL APPARATUS

INVENTORS
ARTHUR M. HETH
CARROLL H. BRUUN
BY Braddock and Braddock
ATTORNEYS

INVENTORS
ARTHUR M. HETH
CARROLL H. BRUUN
BY
Braddock and Braddock
ATTORNEYS

May 4, 1965 A. M. HETH ETAL 3,181,482

PORTABLE PELLET MILL APPARATUS

Filed Jan. 18, 1962 10 Sheets-Sheet 6

INVENTORS
ARTHUR M. HETH
CARROLL H. BRUUN
BY
Braddock and Braddock
ATTORNEYS

PORTABLE PELLET MILL APPARATUS

INVENTORS
ARTHUR M. HETH
CARROLL H. BRUUN
BY Braddock and Braddock
ATTORNEYS

INVENTORS
ARTHUR M. HETH
BY CARROLL H. BRUUN
Braddock and Braddock
ATTORNEYS

INVENTORS
ARTHUR M. HETH
CARROLL H. BRUUN
BY Braddock and Braddock
ATTORNEYS

INVENTORS
ARTHUR M. HETH
BY CARROLL H. BRUUN
Braddock and Braddock
ATTORNEYS

United States Patent Office 3,181,482

Patented May 4, 1965

3,181,482

PORTABLE PELLET MILL APPARATUS

Arthur M. Heth, Mandan, N. Dak., and Carroll H. Bruun, Dallas, S. Dak., assignors to Midwest Feed & Pelleting Co., Inc., Mandan, N. Dak., a corporation of North Dakota Filed Jan. 18, 1962, Ser. No. 167,119
5 Claims. (Cl. 107—4)

The present invention has relation to pellet mills and more particularly to a portable pellet mill apparatus that can be mounted on a semi-trailer truck and transported to field locations for pelleting feed.

Farmers and agricultural experts have recognized the advantages of feeding animals hay and ground supplements in pelleted form. The recent rapid rise in interest in pelleted feeding attests to the fact that it is highly advantageous both from the increased efficiency of handling of pellets over loose forms of feed and in the increase in the amount of weight put on by animals per pound of feed when they are fattened with pelleted feeds. In addition, the pellets may contain a balanced fattening ration and any protein, vitamin or other type of supplement that is necessary to promote rapid growth can be included in the pellet. The animal receives a complete ration in pelleted form and will not suffer from the lack of any of the necessary nutrients. While stationary pellet mills have been in wide use throughout the country, the need has long existed for a portable pelleting mill apparatus that utilizes the proven advantages of the stationary units but is not hindered by the batch type of feeding.

A stationary pellet mill installation necessarily includes a building which involves a large amount of capital. The buildings usually are multistory and the feed material flows from floor to floor during the batch mixing process and then to the pellet mill. The stationary mill must be located close to an ample supply of hay to keep the mill operating at profitable levels and transportation of loose hay is very costly.

A portable pellet mill, such as the one disclosed herein does not require the investment in buildings of a stationary mill. All of the machinery components are positioned on a flat bed trailer. The trailer can be pulled to any location for pellet mill operation. Thus if the hay crop fails in one part of the country the portable pellet mill can be easily moved to location where hay is plentiful. The mill can be kept operating regardless of localized crop conditions to make the most efficient use of the equipment. The pellet mill apparatus can be moved from field to field or from farm to farm in order to accommodate a number of farmers with a single pelleting unit. The pellet mill, as shown, uses a continuous flow feeding process that can be utilized to mix a number of different types of feed or grain with chopped hay and add in necessary supplements or vitamins without using large storage areas. The pellet machine can be kept working at maximum output continuously and there is no need to use the batch process. Thus, by utilizaion of the continuous flow feeding process the operation is made much more efficient and the costs of operation are correspondingly reduced. By a novel arrangement of parts certain proven pellet mill components are utilized to provide for the manufacture of high quality dense pellets at location close to the source of the growing feed and typically close to the place of consumption.

It is an object of the present invention to present a mobile pelleting mill utilizing a continuous flow feeding process to obtain maximum capacity from the components used and obtain uniform, high quality pellets.

Figure 12A:
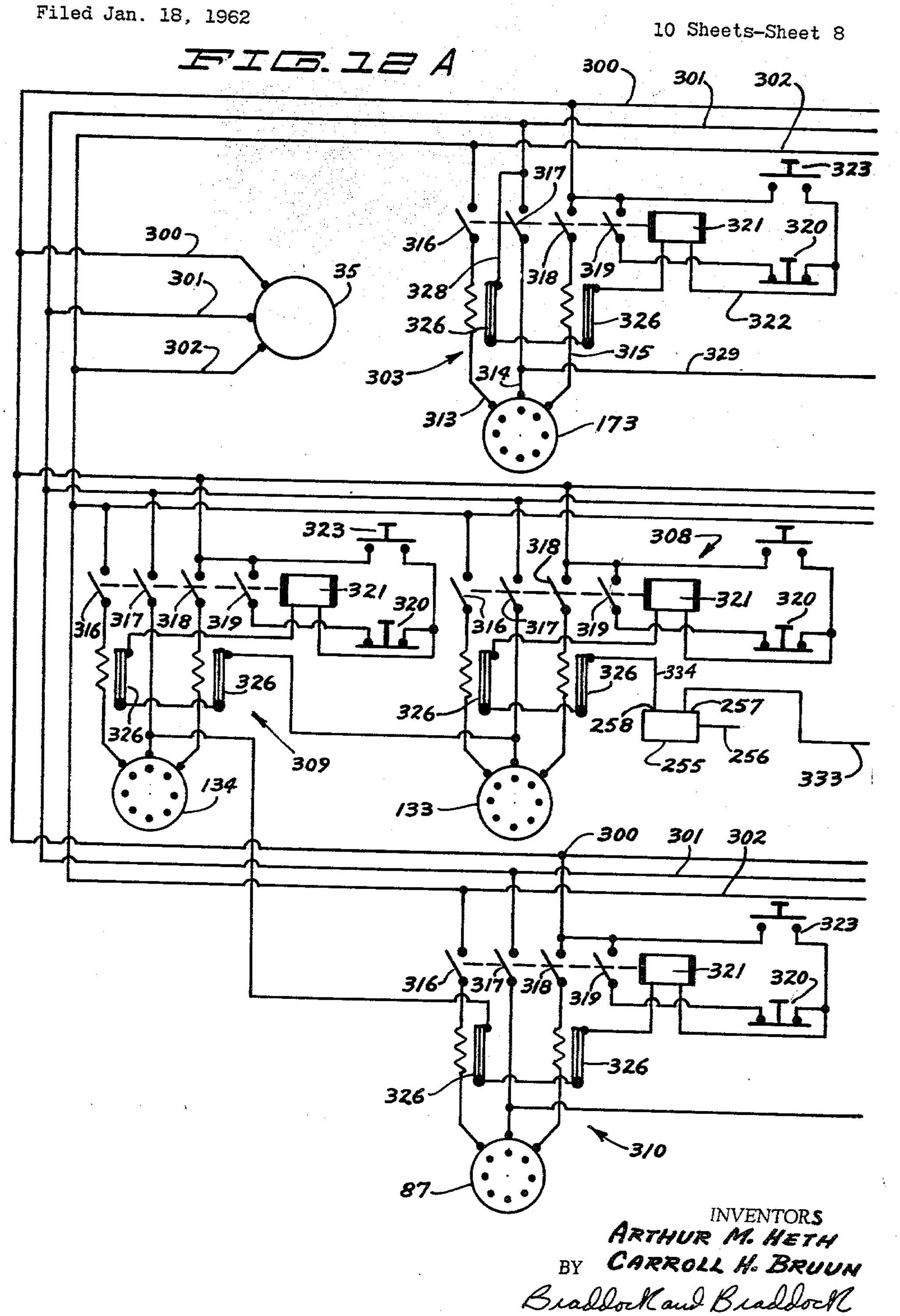
Figure 12B:
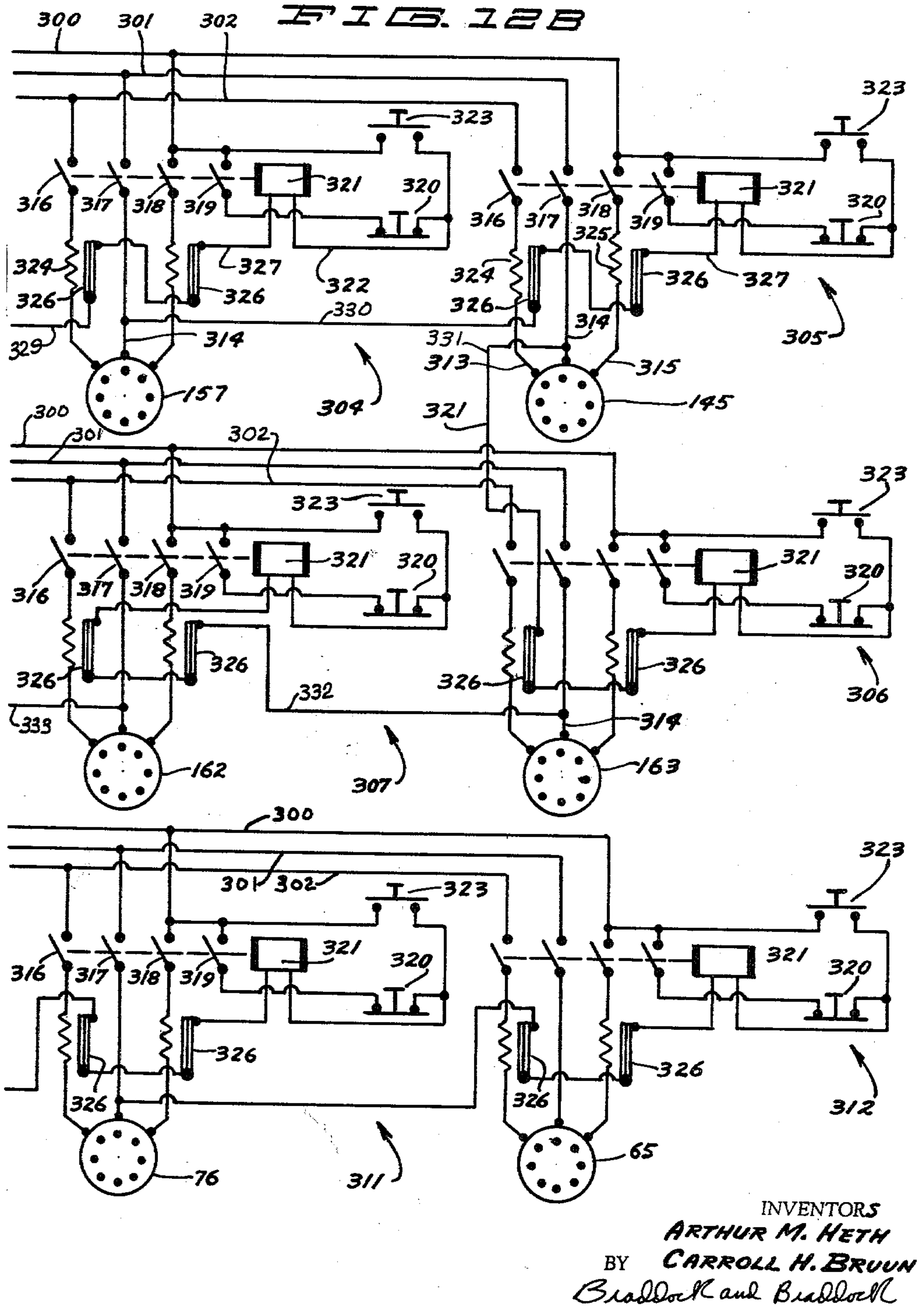
Figure 13:
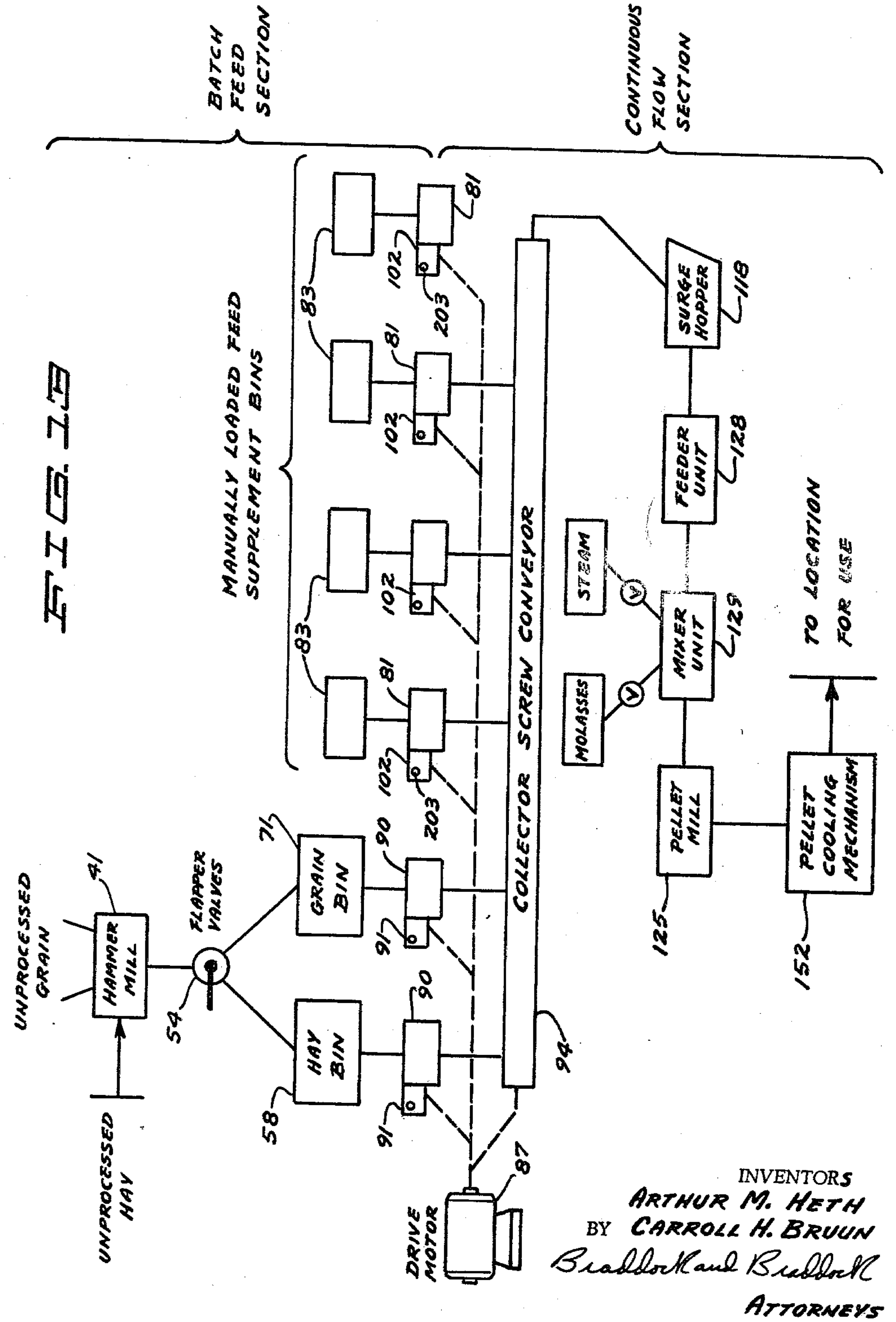

FIGS. 12A and 12B taken together are a schematic representation of the mechanical and electrical power and control system for operating the various material processing and handling components of the invention; and FIG. 13 is a chart showing flow of the various feed constituents according to the method or process of the invention.

Referring to the drawings and the numerals of reference thereon, a portable pellet mill apparatus, indicated generally at 20 is mounted on a flat bed platform 21 which in turn is mounted on tandem dual wheels 22, 22 and is adapted to be pulled by a tractor-truck 23. The portable pellet mill apparatus can be pulled over the ground by the truck to various job site locations or can be left at a job site by lowering landing gear 24 to support the front end of the platform. A plurality of catwalk platforms 25 are provided along the edges of the flat bed platform for the operators of the pellet mill to walk around the unit.

*Basic power unit*

The portable pellet mill is powered by a diesel engine 26 which is connected directly through a coupling 27 to a first main drive shaft 28 which is mounted on a pillow block 29. A handle 31 is used to operate a clutch 32 that connects the first main drive shaft 28 to a second main drive shaft 33 which powers the main components of the pellet mill apparatus.

A chain and sprocket arrangement 34 is used to drive an alternating current generator 35 from shaft 28. The alternating current generator is used as a source of power for various remote electric motors that drive some of the components of the pellet mill apparatus in a manner to be subsequently described. A radiator 36 is provided for coding of the diesel engine 26.

*Hammermill station*

Figure 1:
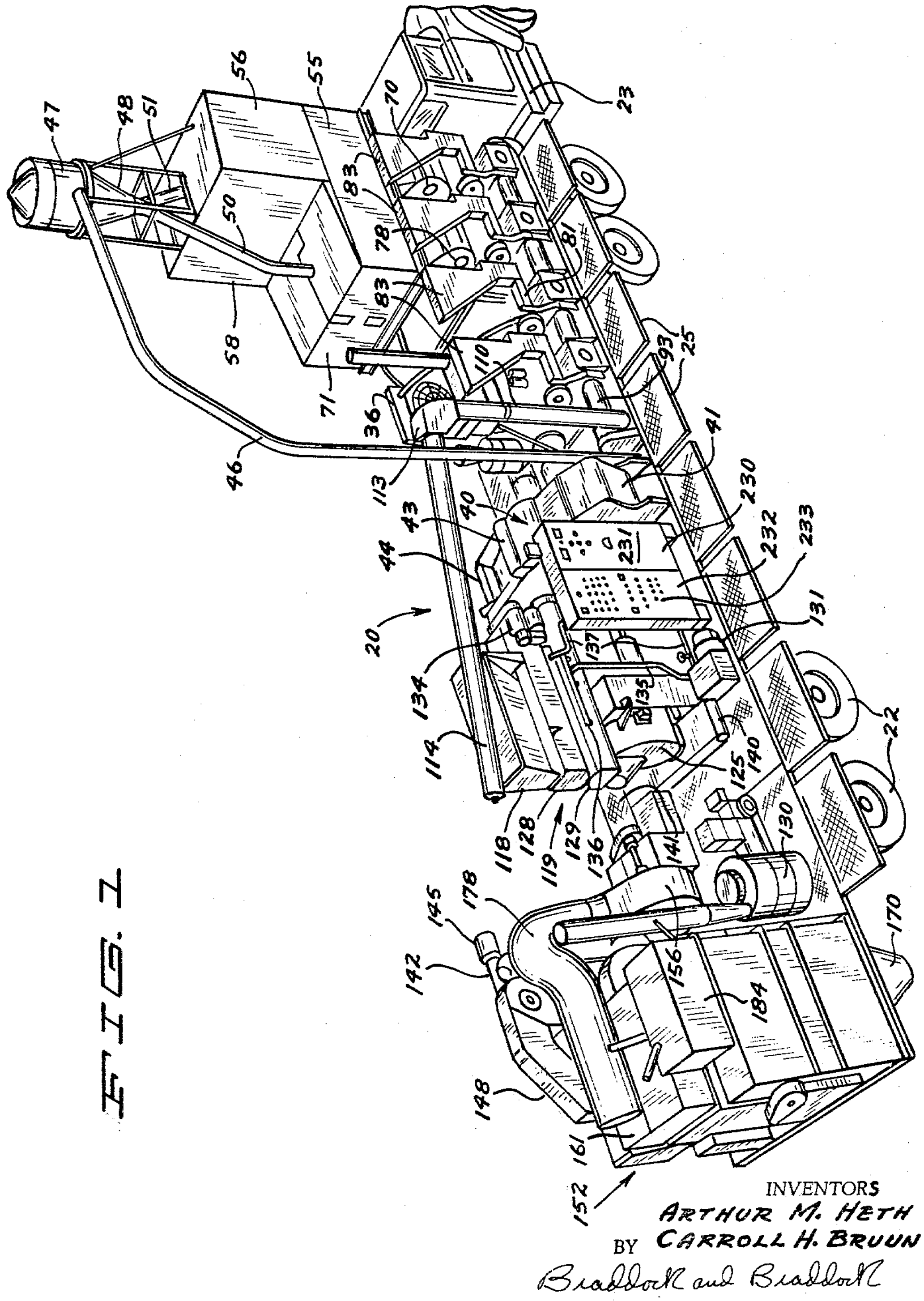
FIG. 1 is a perspective view of a mobile pelleting mill apparatus made according to the present invention.
Figure 3:
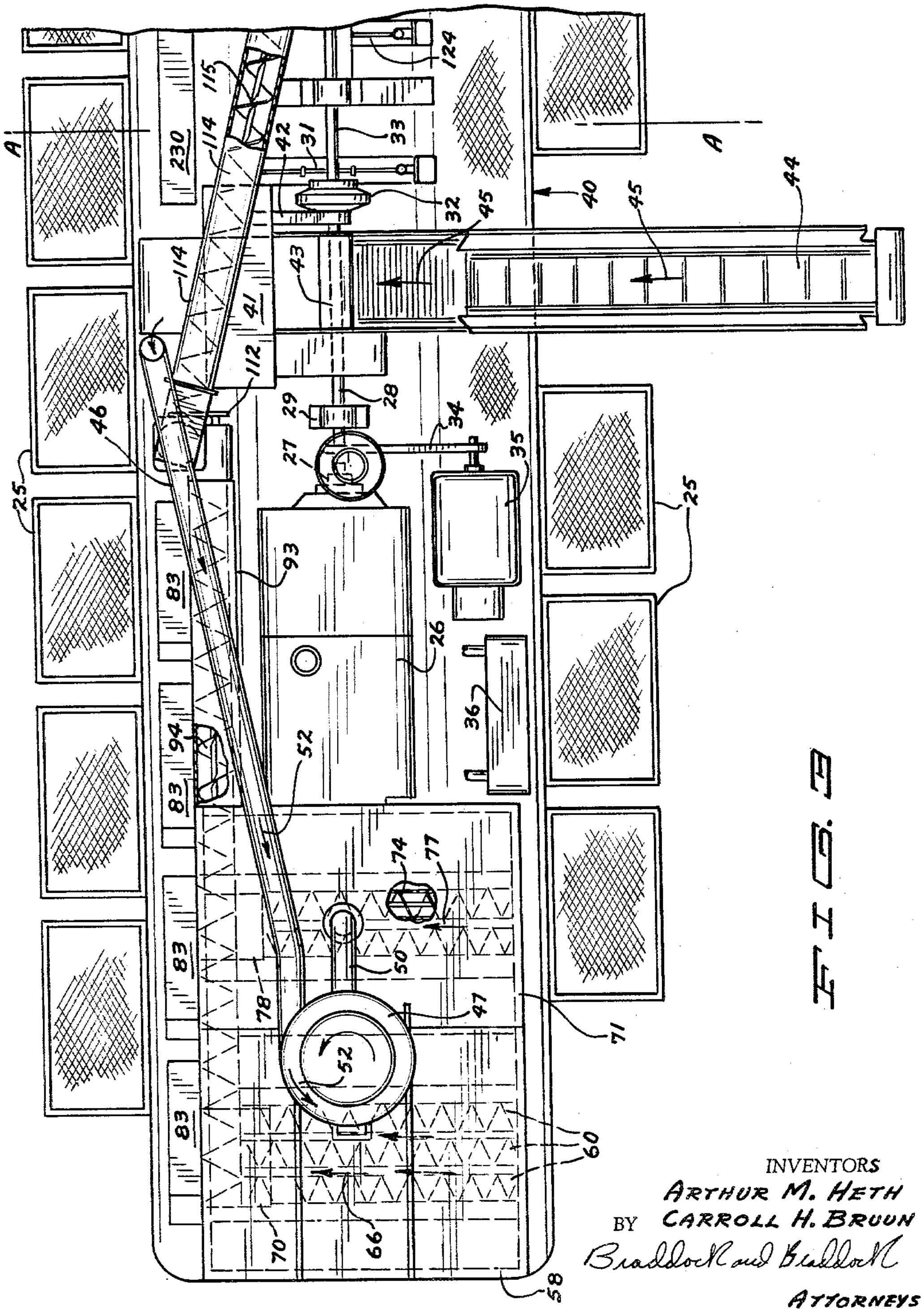
FIG. 3 is an enlarged top plan view of a front portion of the device of FIG. 2.

The hammermill station is indicated generally at 40 and includes a hammermill 41 that is driven through clutch 32 from shaft 28 with a chain 42 acting on suitable sprockets. The hammermill is fed through a hopper 43 by an elevating conveyor 44 which is powered through the hammermill. The hammermill conveyor 44 is used to transport baled hay into the mill where it can be properly chopped. The hay moves in a direction as indicated by arrows 45 into the mill where it is pulverized or ground according to the desires of the operator by changing the size of hammermill screen. The hammermill can also be used for the grinding of grains. The grain is manually fed directly into the hopper 43 and the elevating conveyor 44 is normally not used with grain. The hammermill and elevating conveyor for accomplishing the purpose of invention are commercially known and can be of any usual or preferred construction. As most clearly seen in FIGS. 1 and 5, after the hammermill has chopped or pulverized the grain or hay, it is blown up through a conveyor pipe 46 into a cyclone dust collector 47 and drops down through a provided chute 48 and through a diverter valve arrangement located in a throat 49 into either a grain discharge chute 50 or a ground hay discharge chute 51. The material will move in a direction as indicated by arrows 52 in FIG. 3. The cyclone dust collector is used to prevent the discharge of excess amounts of dust from the chopped material. In addition, a magnetic separator 53 is used in the dust collector to remove pieces of metal from the chopped material.

*Hay storage compartment*

A chopped hay storage bin 58 is formed with a lower section 55 and an upper section 56 and is mounted on suitable supports 57 on top of the flat bed platform 21. The lower section 55 of the hay bin has a tapered, bottom portion 59 and a plurality of screw conveyor augers 60 are positioned in the bottom portion of the bin. The screw conveyor augers 60 are driven through suitable sprockets 61 and a chain 62 which in turn is driven by a sprocket 63 on a speed reducr 64. The speed reducer is driven by an electric motor 65 which is powered through suitable controls including an on-off switch and motor starter from the A.C. generator 35. The screw conveyors 60 are driven to move the grain in a direction indicated by arrows 66 toward one end of the hay bin and into a feeder hopper 70 that is positioned below the hay bin.

The upper section 56 of the hay bin 58 as well as the cyclone dust collector 47 and the piping can be removed to lower the over-all clearance to permit traveling over the road with the unit.

*Grain storage compartment*

Figure 2:
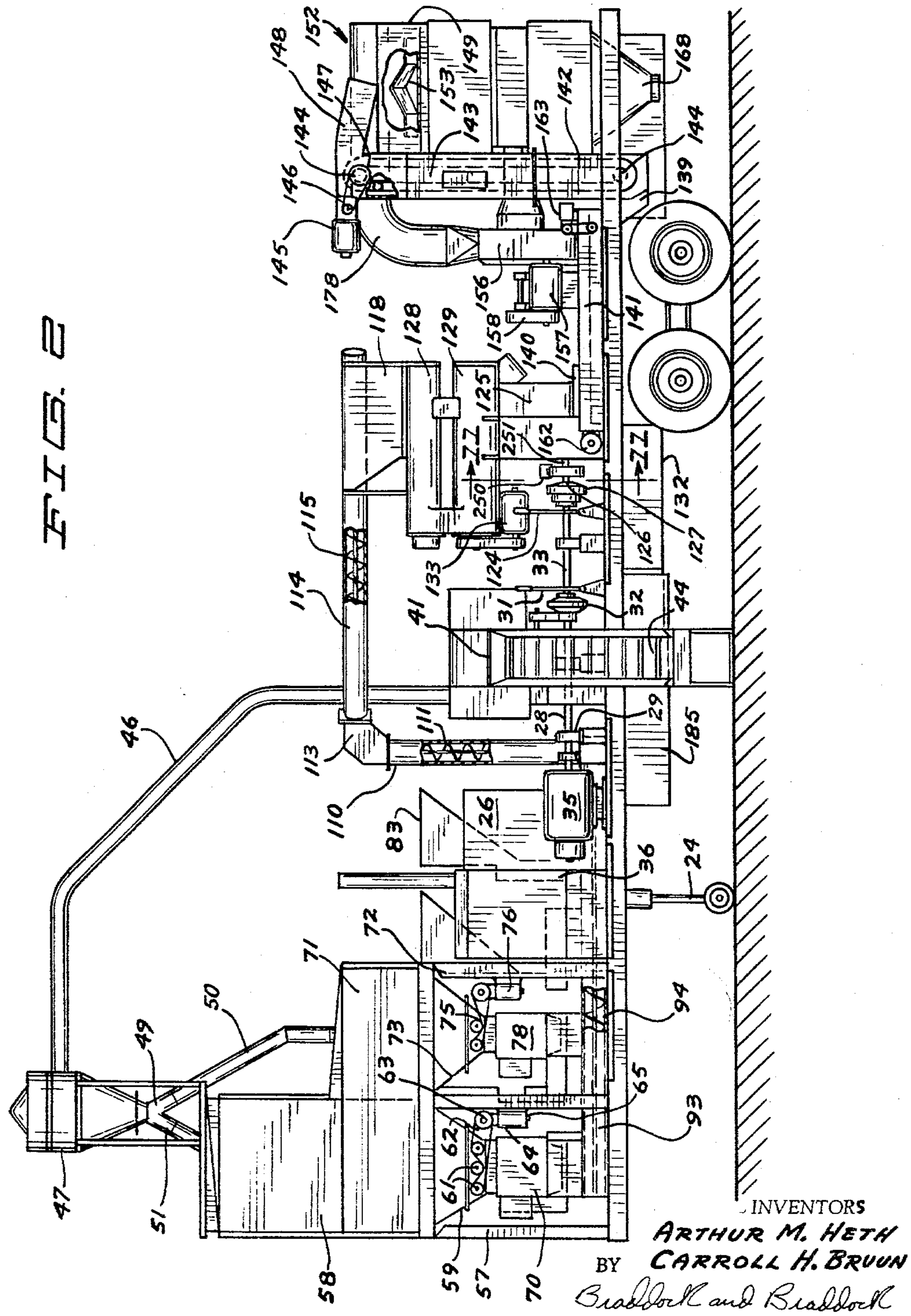
FIG. 2 is a side elevational view of the device of FIG. 1 as viewed from a left side thereof.

As seen in FIG. 2, the grain storage compartment or bin 71 is mounted on suitable supports 72 on the flat bed platform 21 and is located next adjacent the hay storage bin. The grain storage bin also has a tapered lower section 73 in which a pair of auger screw conveyors 74, 74 are rotatably mounted. The augers 74, 74 are driven through a chain and sprocket arrangement 75 and an electric motor and gear reducer assembly 76 in the same manner as the hay bin screw conveyors. The electric motor is controlled through an on-off switch and a motor starter from the A.C. generator 35.

The screw conveyors 74, 74 move material in direction as indicated by arrows 77 toward a feeder hopper 78 located beneath one end of the grain storage bin.

*Feed supplement storage bins*

Figure 5:
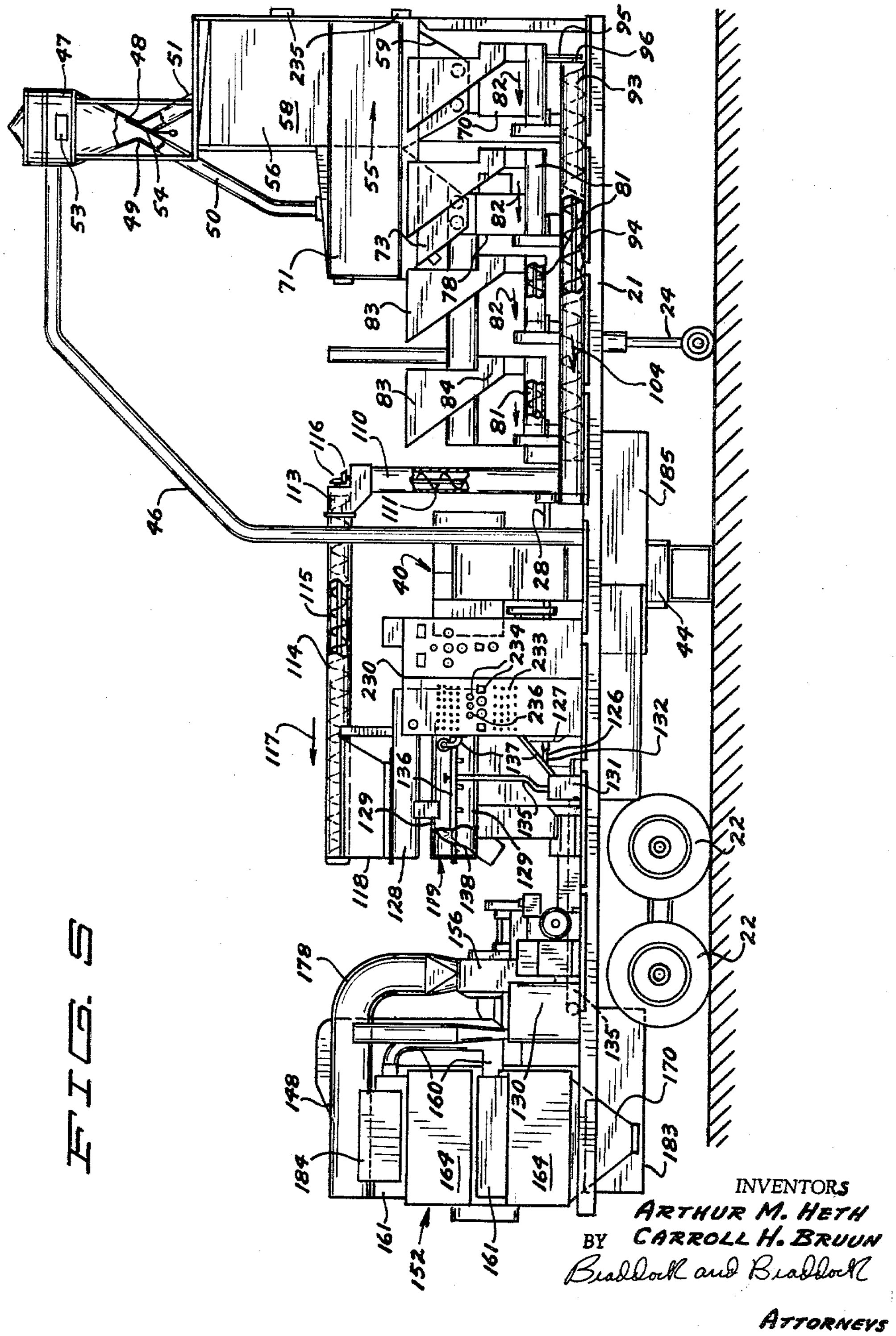
FIG. 5 is a side elevational view of the device of FIG. 1 as viewed from the right side thereof.

A plurality of feed supplement storage bins 83, four as shown, are mounted adjacent one side of the flat bed platform 21 and are provided for holding feed supplements, such as vitamins, protein supplements, hormone additives or any other feed supplement which may be needed to make a balanced feed ration. The feed supplement storage bins 83 are comprised as non-bridging hoppers and as seen in FIG. 5 the material drops down into a throat 84 that is open to a relatively short screw conveyor and housing assembly 81. Screw conveyor assemblies 81 are adapted to move the material in direction as indicated by arrows 82. The details of the drive will be described later.

*Continuous flow feeding apparatus*

Figures 6, 7:
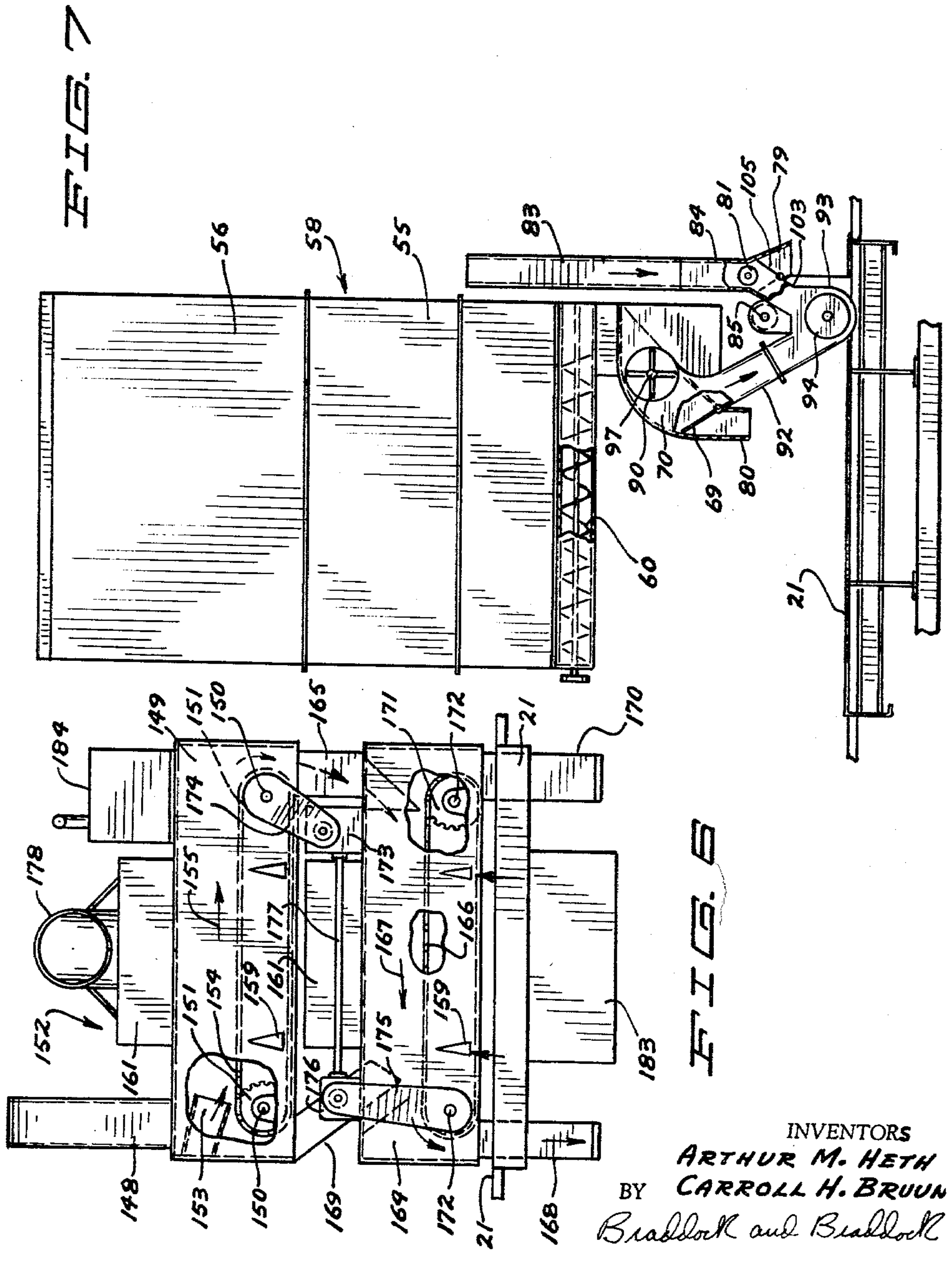
FIG. 6 is a rear elevational view of the device of FIG. 1.
FIG. 7 is a fragmentary enlarged rear elevational view of a hay storage hopper and feed supplement hopper made according to the present invention.
Figures 8, 9, 10:
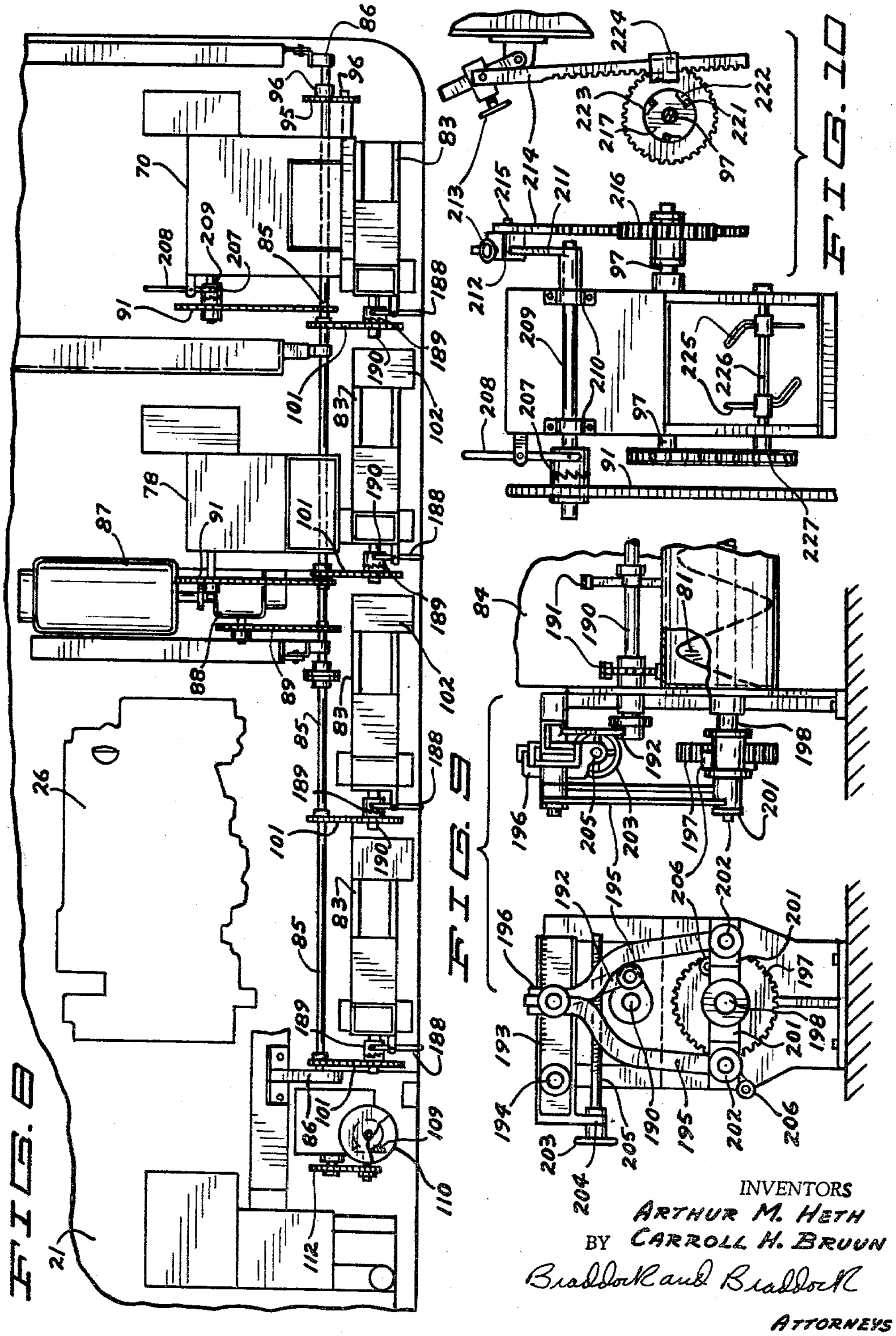
FIG. 8 is a fragmentary top plan view of the device of FIG. 1 showing the feed hoppers and associated drives therefor.
FIG. 9 is a side elevational view and an end elevational view of a feed supplement hopper and ratchet drive mechanism of the present invention.
FIG. 10 is a side elevational view and an end elevational view of a feeder apparatus for chopped grain and hay of the present invention illustrating drive mechanism for varying the rate of feed of said feeders.

As seen in FIG. 8 all of the feeding mechanisms for the various storage compartments, the hay, the grain, and the feed supplement storage compartments, are driven from a common line shaft 85 that is rotatably mounted on suitable bearings 86 and is driven with an electric motor 87 which drives through a speed reducer 88. The speed reducer 88 is connected through a chain and sprocket arrangement 89 to the shaft 85. Motor 87 is powered through an on-off switch and a motor starter from the A.C. generator 35. As typically shown in FIG. 7 the feeder hoppers for the hay and grain storage bins each have a wing-type feeder element 90 rotatably mounted on a shaft 97 mounted in their respective feeder hoppers. The wing-type feeder elements are each driven through a chain and sprocket drive 91 from the line shaft 85. The specific drive arrangement for the wing-type feeder elements will be described later. The ground hay and ground feed will drop from their respective feeder hoppers 70 and 78 through provided chutes 92, 92 in a collector screw conveyor housing 93. A collector screw conveyor 94 is rotatably mounted in the housing and is driven by a chain 95 and sprockets 96, 96 from the line shaft 85. Thus whenever the line shaft is turning and driving the wing-type feeder elements the screw conveyor 94 is also turning and is conveying the material away from the storage bins. The wing-type feeders each have an alternate discharge spout 80 that can be used for checking the rate of feed of the feeders, if desired. Ground material can be discharge through spout 80 into a checking pan to determine the weight of feed discharged in a predetermined length of time. A flapper valve 69 is mounted in each of the feeder hoppers and may be moved to divert material from the hopper either to the transition chutes 92 or the alternate discharge spouts 80.

Each of the feed supplement storage bins has a short conveyor assembly 81, as stated previously, and these conveyor sections are driven through suitable ratchet drive assemblies 102 which will be explained more fully later, by a chain and sprocket arrangement 101 from the line shaft 85. The ratchet drives permit the operator of the machine to vary the relative amounts of material being fed from the hoppers through the conveyor sections 81. As seen in FIG. 7 the conveyor sections 81 are each in turn open through a transition chute 103 to the collector screw conveyor housing 93. As material is fed from the screw conveyor assembly 81 is passes into the collector screw conveyor housing 93 and when the collector screw conveyor 94 is turning is mixed with the ground feed and ground hay coming from the feed and hay storage bins.

Each feed supplement storage bin 83 has an alternate discharge chute 79 that is used to discharge the supplement into a checking pan to determine the rate of flow of material from the bins. A flapper valve 105 is positioned at the end of each screw conveyor 81 and can be moved to divert feed from the conveyor 81 to either the transition chute 103 or the alternate discharge chute 79.

The individual screw conveyor sections for these feed supplement storage compartments are independently controlled and driven. Thus, the amount of each of the feed supplements entering the collector screw conveyor housing can be controlled. The operator in this manner can control the makeup of the final ration which is made into pellets. Also, the wing-type feeders can be controlled so that the amount of hay or grain fed into the collector screw conveyor can be varied also. The variable feed drive arrangements will be explained fully later.

Pulverized or ground feed material moving in the collector screw conveyor is conveyed in direction as indicated by arrow 104. An upright screw conveyor housing 110 which has a vertical screw conveyor 111 rotatably mounted therein is open to the collector screw conveyor. A chain and sprocket assembly 112, see FIG. 8, drives suitable right angle bevel gears 109 which in turn drive the upright screw conveyor from the collector screw conveyor.

A 90 degree elbow 113 connects the upright screw conveyor housing 110 to a horizontal screw conveyor housing 114. The horizontal screw conveyor housing houses a horizontal screw conveyor 115 that is rotatably mounted therein. A pair of bevel gears 116, 116 are mounted on the respective shafts of the horizontal and upright screw conveyors and are in mesh to drive the horizontal screw conveyor whenever the upright screw conveyor is turning.

The horizontal screw conveyor conveys material in direction as indicated by arrow 117. The horizontal screw conveyor housing 114 is attached to and open to a surge hopper 118 of a pellet mill assembly 119.

*Pellet mill assembly*

The pellet mill assembly 119 has a pellet mill housing 125 in which the pellet forming die is mounted. The pellet mill housing is mounted on the flat bed platform 21 and is positioned so that an input power 126 to the pellet mill is aligned with the main power shaft 33 which is driven by the diesel engine 26. A clutch 127 connects the shaft 33 and the input shaft 126 to the pellet mill. The clutch 127 is operated with a handle 124.

As stated previously, the horizontal auger housing 114 is open to the surge hopper 118. The surge hopper in turn discharges the material into pellet mill auger feeder unit 128 and the material is then feed through this unit by a screw conveyor auger (not shown) down into a pellet mill auger mixer unit 129. The mixer unit has a mixer auger 138 mounted therein for mixing the material together. In the mixer unit, steam, which is produced by a steam generator 130, is injected into the feed and used as a binder to hold the pellets together. Molasses is pumped into the mixer unit by a molasses pump 131 from a molasses storage tank 132 through a pipe 137. The molasses increases the palatibility of the pellets and also serves as a binding agent. Steam pipe 135 passes through the molasses tank 132 to keep the molasses hot and liquid.

An electric motor 133 is used to drive the mixer unit 129 and an electric motor 134 is used to drive the feeder unit 128. The electric motors 133 and 134 are each powered from the A.C. generator 35 and are controlled by separate on-off switches and motor starters.

The mixture of feed, hay, supplements, steam and molasses is then fed into the pellet mill housing 125 and the pellets are formed. The pellet mill is available commercially and may be of any usual or preferred construction. The pellets are discharged from the mill onto a first belt conveyor 140, which in turn deposits them on a second belt conveyor 141. The second belt conveyor 141 moves the pellets, which are newly formed and are hot due to the introduction of steam, over to a vertical bucket elevator 142, dumps them into a hopper 139 at the foot of the elevator. The first conveyor belt is driven by a motor and gear reducer set 162 and the second conveyor belt is driven by a motor and gear reducer set 163. The motors for the conveyors are each powered from A.C. generator 35 through separate on-off switches and motor starters. The vertical bucket elevator 142 has an outer housing 143 in which a pair of vertically spaced shafts 144, 144 are rotatably mounted. Sprockets are mounted on the shaft 144, 144 and a bucket type conveyor chain is mounted over the sprockets. The bucket elevator is driven by an electric motor 145 which drives a gear reducer 146 which in turn drives the upper one of shafts 144 through a sprocket and chain arrangement 147. The motor 145 is powered through an on-off switch and a motor starter from the AC generator 35.

*Pellet cooling mechanism*

As best seen in FIG. 6, the pellet cooling mechanism, illustrated generally at 152 is mounted on flat bed 21 and is provided to cool the pellets before they are transported to storage or to location for use. The pellets are dumped by the bucket elevator 142 into a delivery chute 148 that directs the pellets toward a first end of an upper cooling compartment and substantially the transverse center thereof. The pellets drop from the delivery chute through a provided opening in the upper cooling compartment 149 and onto an inverted V shaped divider 153 that spreads the pellets across the width of an upper conveyor belt 154. The upper conveyor belt is mounted over sprockets 151 that are mounted on shafts 150, 150 which are rotatably mounted at opposite ends of the upper cooler compartment.

The upper conveyor belt 154 is an open mesh type belt and is driven by an electric motor and gear reducer set 173 acting through a chain and sprocket drive 174. The belt moves in direction as indicated by arrows 155 and the hot pellets are carried in this direction by the belt.

After the pellets are discharged from upper belt 154 they travel under the force of gravity into a lower pellet cooler compartment 164 through a transition chute 165 onto a lower conveyor belt 166. The lower conveyor belt 166 is mounted on sprockets 171 that in turn are drivably mounted on shaft 172 which are rotatably mounted at opposite ends of the lower pellet cooler compartment 164. The lower conveyor belt 166, which is also an open mesh type belt, is driven by a chain and sprocket drive 175 that drives one of the shafts 172. The chain and sprocket drive 175 extends from a gear box 176 which is driven by a shaft 177 that in turn extends from the motor and gear reducer set 173. The pellets are moved by the lower conveyor belt 166 in direction as indicated by arrows 167. The pellets are discharged from belt 166 out through a discharge chute 168 into a suitable conveyor or into an elevator which will transport the pellets to a truck box or to a predetermined storage point.

The "fines" or small pieces that break off from the pellets in the upper cooling compartment fall onto the bottom of the cooling compartment and are moved by the belt 154, which scrapes along the bottom panel of the upper cooling compartment, to a chute 169 which directs the fines into the lower cooling compartment 164. The fines are moved along the bottom of the lower cooling compartment by belt 166 and are discharged out of a fines discharge chute 170. An elevator can be provided to return the fines to the pellet mill surge hopper 118 and they can be re-pelleted.

A centrifugal exhaust air fan 156 is driven by an electric motor 157 and a suitable chain and sprocket drive 158. The lower pressure side of exhaust fan 156 is connected through duct work 160 to plenum chambers 161, 161 that are open to the upper and lower pellet cooling compartments. The exhaust fan 156 draws air into both of the pellet cooling compartments through openings 159 in the walls of the compartments. The fan thus draws air across both the upper and lower mesh belts so that cool air will flow across the hot pellets.

A hot air discharge duct 178 extends from the outlet of fan 156 and discharges the air from the pellet cooler apparatus away from the pelleting operation.

A water tank 183 is provided for the steam generator and a fuel oil supply tank 184 is also provided to supply fuel to the steam generator burner. A diesel fuel tank 185 is provided for the diesel engine and is mounted below the flat bed platform.

*Ratchet feeder mechanism for supplement hoppers*

As best seen in FIG. 8, the ratchet feeder mechanism 102 of each feed supplement is, as stated previously, driven by a chain and sprocket arrangement 101 from the line shaft 85. The chain and sprocket 101 drive a ratchet counter shaft 190 that is rotatably mounted with respect to the base portion of the supplement feeder hoppers through a dog clutch 189 that can be engaged or disengaged with a lever 188. The shaft 190 has a pair of paddles 191, 191 fixedly attached thereto and positioned in the throat 84 of the feeder hopper to agitate material in the hopper. Each of the counter shafts 190 extend through the throat portion 84 of its associated feed supplement hopper and is positioned above the short conveyor section 81.

The drives for the feed supplement hoppers are identical and a typical one is shown in FIG. 9. A crank arm 192 is drivably mounted on an outwardly extending portion of shaft 190 and is attached to an actuating lever 193 that is pivotally attached, as at 194, to the feed supplement hopper. As the shaft 190 rotates crank arm 192 will also rotate and the actuating lever 193 will move up and down in an arc about pivot 194. A pair of ratchet levers 195, 195 are pivotally mounted on a sliding block 196 that in turn is slidably mounted on the actuating lever 193. The ratchet levers 195, 195 extend downwardly toward a ratchet wheel 197. The ratchet wheel 197 is mounted on a drive shaft 198 for the short conveyor section 81. The ratchet levers 195, 195 have connector straps 201, 201 that are pivotally mounted to their respective ratchet levers 195, as at 202, and are both pivotally mounted over shaft 198.

A hand wheel 203 has an integral threaded shank 205 and is rotatably mounted on an outwardly extending ear 204 of the actuating lever 193 and is threadably mounted with respect to block 196. By turning the hand wheel so the threads of shank 205 act on block 196, the distance that block 196 is situated from pivot point 194 can be changed.

The ratchet levers 195 each have a pawl 206 operably associated therewith. The ratchet is double acting so that on the upstroke of actuating lever 193 a first of the pawls 206 will engage wheel 197 and a second of the pawls 206 will slip by the teeth on the ratchet wheel. On the down stroke of the lever 193 the second pawl 206 will engage ratchet teeth and keep driving the ratchet wheel in the same direction while the first pawl slips over the teeth. Thus, as the lever 193 goes up and down, the shaft 198 will be rotated by the action of the pawls 206.

In order to speed up or slow down the rate of feed of the conveyor which is driven by shaft 198 and which conveys feed from the feed supplement hoppers, the distance from pivot 194 to the center of block 196 can be adjusted. As the distance increases, the rate of feed of the conveyor will increase because the ratchet levers will move the ratchet wheel 197 and, consequently, shaft 198 further at each stroke of the actuating lever.

*Ratchet for wing-type feeders on grain and hay bins*

FIG. 10 illustrates a type of ratchet drive that can be used for driving the wing-type feeder elements 90 which meter the material flowing from the chopped hay and grain bins of the pellet mill apparatus. Chain and sprocket drives 91 used to drive the wing-type feeders are each driven by the line shaft 85 and in turn each chain and sprocket assembly drives a clutch hub 207 that can be engaged and disengaged with a lever 208 to drive a counter shaft 209. Both drives for the wing-type feeders are identical and only one will be described. The counter shaft is mounted on suitable bearings 210, 210 and the bearings are fixed to the wing-type feeder housing. A crank arm 211 is drivably mounted on shaft 209 and has a sliding adjustment block 212 mounted thereon. Adjustment block 212 has a set screw 213 to lock it in position. A rack 214 is pivotally mounted as at 215 on the sliding block 212. The rack engages a gear 216 that is mounted on a one-way drive hub 217 which in turn is mounted on the shaft 97 that is used to drive the wing-type feeder elements. The one-way drive hub utilizes balls 221 that act on tapered surfaces 222 of the hub and thus the balls are wedged up against an inner surface 223 of the gear when the gear is rotated in a first direction. The rack 214 is held in engagement with the gear by a bracket 224 that is slidably mounted with respect to the rack and is rotatably mounted on shaft 97.

By moving the sliding block 212 further away from or closer to shaft 209 the length of stroke of the rack can be controlled and thus the amount the wing-type feeder elements will rotate for each revolution of shaft 209 can be changed. In this manner the amount of material being fed by the wing-type feeders can be controlled.

A pair of agitators 225, 225 are fixedly attached to a shaft 226 which is rotatably mounted in the front portion of the wing-type feeder housing and this shaft is driven through a chain and sprocket arrangement 227 from the shaft 97 for the wing-type feeders. The agitators 225 prevent the feed from bridging or lodging in the feeder so that it cannot flow freely.

*Electrical controls*

In the use of the apparatus of the present invention, it is important that the various materials flow through the processing steps without interruption. As materials move from the various storage bins and conveyors, the pellet mill feeder unit and mixture unit, through the pellet mill, the pellet conveyors and the cooling mechanism, it is important that a jam up of materials does not occur. In other words, it is essential that the materials are conveyed away from the preceding instrumentality which is conveying or processing the materials. In order to provide for this, the electric motors which drive the various processing, conveying and cooling instrumentalities are interlocked so that jamming or overload or other failure of any instrumentality and its associated motor will automatically cause all of the preceding motors to be disabled thus to stop feed and processing of materials through the apparatus toward the point of failure.

As previously stated, the last instrumentalities to handle the pellets are the upper cooling conveyor belt 154 and the lower cooling conveyor belt 160. These are both powered by the motor 173 and associated gear reducer unit. This motor must always be operating whenever materials are being processed by the apparatus of the invention so that the finished pellets will be removed from the machine. The next instrumentality back along the chain is the centrifugal exhaust air fan 156 which is driven by an electric motor 157. The bucket elevator 142 is driven by motor 145. The second hot pellet belt conveyor 141 is driven by motor 163 and its associated gear reducer set, while the first hot pellet belt conveyor 140 is driven by motor 162 and its associated gear reducer.

As previously explained, the instrumentalities feeding to the pellet mill assembly 119 include the pellet mill mixer unit 129 and its associated auger which is driven by electric motor 133; the pellet mill feeder 128 which is driven by electric motor 134; the adjutable feed augers from the hay, grain and feed supplement storage bin compartments are all driven by motor 87; grain storage bin augers 74 which are driven by electric motor 76 and its associated gear reducer unit; and hay bin augers 60 which are driven by electric motor 65 and its associated gear reducer 64.

Figures 4, 11:
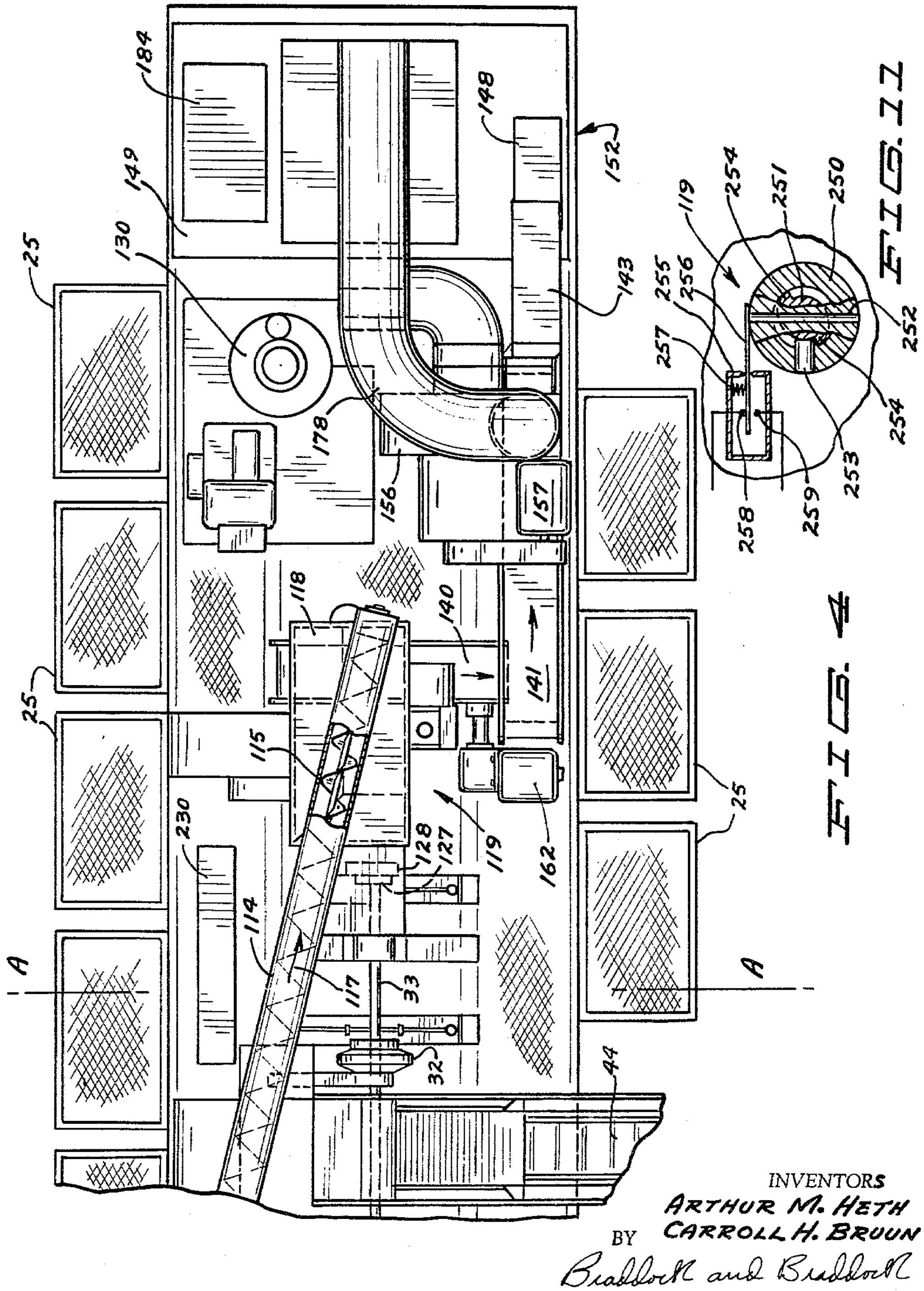
FIG. 4 is an enlarged top plan view of the rear portion of the device of FIG. 2 and associated with FIG. 3 along line A—A.
FIG. 11 is an enlarged vertical sectional view with parts broken away and taken on line 11—11 in FIG. 2.

In order to protect the mechanism of the pellet mill assembly 119 itself, the rotating parts are coupled to shaft 126 by means of a collar, shear pin arrangement as best seen in FIG. 11. A collar 250 is integral with the pellet mill input shaft 126 and is in concentric surrounding relationship to a pellet mill drive shaft 251 which extends into the pellet mill assembly 119 to power the pellet mill. The pellet mill drive shaft 251 and pellet mill input shaft 126 are normally fixed against rotational movement with respect to each other by a shear pin 252 which is driven through the collar 250 and the drive shaft 251. If and when the pellet mill assembly 119 is subjected to stresses in excess of those for which it was designed, the shear pin 252 will break and will allow the collar 250 and its associated pellet mill input shaft 126 to rotate freely without necessitating further rotation or movement of the parts inside of the pellet mill assembly.

Slidably mounted in the outside wall of the collar 250 is a signal pin 253. This pin is frictionally held in the wall of the collar 250 and will not slide with respect to that wall under normal conditions. A pair of camming ears 254, 254 are provided integral with and extending outwardly from shaft 251 as best seen in FIG. 11. If and when the pellet mill assembly becomes jammed and the shaft 251 slows down or stops causing the shear pin 252 to break, the collar 250 will rotate rapidly with respect to the ears 254, 254, and the camming surfaces will force the pin 253 outwardly against the frictional forces tending to hold it in place. It will ride with the collar in this extended position.

A microswitch 255, mounted on the wall of pellet mill assembly 119 has a switch arm 256 riding in adjacent or continguous relationship to the outer surface of the collar 250. As the pin 253 rides around with the collar in its extended position, it will hit the microswitch arm 256. This will cause the normally closed electrical contact between a center contactor 257 and the microswitch and a first contactor 258 thereof to be broken. At the same time, a contact will be made between the center contactor 257 and a second contactor 259 of the microswitch. As will be explained later, this break between contactors 257 and 258 will cause the electric motors driving the instrumentalities preceding the pellet mill to be shut down, and the contact with contactor 259 will cause an indicator light 236 to be illuminated.

The three phase generator 35 feeds power lines 300, 301 and 302 and these lines feed to ten different motor starters designated 303 through 312 respectively. Each of these motor starters has motor input power lines 313, 314 and 315 leading to the motor with which it is associated. Three normally open relay contactors 316, 317 and 318 are positioned between power lines 300 and 313, 301 and 314, and 302 and 315, respectively. Each starter is also provided with a normally open interlock contactor 319 which closes an interlock circuit between power line 300 and a normally closed "Push To Stop" switch 320 which is also a part of each starter.

Each of the motor starters includes a relay coil 321 which has a lead wire 322 connected to the "Push To Stop" switch 320 and to a normally open "Push To Start" switch 323. The other side of this switch 323 is connected to power line 300.

Motor input power line 313 has an overload resistance heater 324 therein and motor input power line 315 has an overload resistance heater 325 therein. In each starter, one of a pair of bi-metallic strips 326, 326 is situated adjacent to each of these heaters 324 and 325, and these bi-metallic strips are connected in series with each other. One end of this set of bi-metallic strips is connected through lead line 327 to a second terminal of relay coil 321. The first motor starter 303 is associated with motor 173, and the second end of the bi-metallic strip series is connected through a line 328 to power line 301.

Referring now to starter 303 and motor 173, when the operator wants to put the apparatus of the invention into operation, he will first press "Push To Start" switch 323 of starter 303 thus forming a connection from power line 300 through relay coil 321 and the bi-metallic strips 326, 326 to power line 301. This will cause the contactors 316, 317, 318 and the interlock contactor 319 of the relay to close, thus energizing the motor 173 and locking the "Push To Stop" button 320 in the circuit.

When it is desired that the motor 173 be stopped, it is simply necessary to press the "Push To Stop" button 320 to open the circuit to the relay coil 321 thus to allow contactors 316, 317, 318 and 319 to drop out of the circuit removing energy to the motor 173.

As will be subsequently explained, this automatically shuts down all of the rest of the nine interlocked motors.

Motor starter 304 is associated with motor 157. In order to insure that motor 157 becomes inoperative at the same time motor 173 becomes inoperative, an interlock line 329 is provided from metallic strips 326, 326 of starter 304 to motor input power line 314 of starter 303. Assuming motor 173 to be in operation, when "Push To Start" switch 323 of starter 304 is pushed, a circuit is set up from power line 300, through "Push To Start" switch 323, relay coil 321 and the bi-metallic strips 326, 326 back to power line 301 through output power line 314 of starter 303 and contactor 317 of that starter. As previously explained in connection with the first starter, this causes the contactors 316, 317 and 318 and interlock contactor 319 of starter 304 to be closed. This will cause motor 157 to be operated, and will lock the starter in the circuit. However, as soon as contactor 317 of starter 303 opens due to failure or overload or intentional shut down of motor 173, power to relay coil 321 of starter 304 is removed, and the relay contactors of starter 304 all open shutting down motor 157.

Similarly, starter 305 is associated with motor 145, and an interlock line 330 from bi-metallic strips 326, 326 of starter 305 extends to power line 314 of starter 304.

Starter 306 is associated with motor 163, and an interlock line 331 extends from the bi-metallic strips 326, 326 of starter 306 to power line 314 of starter 305.

Starter 307 is associated with motor 162; and an interlock line 332 extends from bi-metallic strips 326, 326 of starter 307 to power line 314 of starter 306.

Starter 308 is associated with motor 133. This motor furnishes power to an instumentality which feeds toward and into the pellet mill assembly 119 itself. Accordingly, provision is made to automatically shut down this motor and all motors driving preceding instrumentalities if the pellet mill becomes inoperative. This is done through the microswitch 255, previously described. An interlock line 333 leads from input power line 314 of starter 307 to contactor 257 of microswitch 255, and an interlock line 334 leads from contactor 258 of microswitch 255 to the bi-metallic strips 326, 326 of starter 308.

As will be seen, when "Push To Start" switch 323 of starter 308 directs power to relay coil 321 and thus closes contactor 319 to lock "Push To Stop" switch 320 of that starter and the relay coil in the line, the motor 133 will be operative and will continue to operate until contactor 317 of starter 307 opens; or until contact between contactors 257 and 258 opens due to failure of shear pin 252 and the pellet mill assembly 119; or until "Push To Stop" switch 320 or one of the bi-metallic strips of starter 308 is opened. When one of these events happens, motor 133 will be removed from the line.

Starter 309 is associated with motor 134, and an interlock line extends from input power line 314 of starter 308 to the bi-metallic strips 326, 326 of starter 309.

Starter 310 is associated with motor 87, and an interlock line extends from power line 314 of starter 309 to the bi-metallic strips of starter 310.

Starter 311 is associated with motor 76 and the interlock line from power line 314 of starter 310 extends to the bi-metallic strips 326, 326 of starter 311.

Starter 312 is associated with motor 65, and the interlock line extends from power line 314 of starter 311 to bi-metallic strips 326, 326 of one starter 312.

As will be understood, at least one of the overload resistance heaters 324 and 325 of any of the motor starters associated with the ten motors in the interlock chain will become overheated should the mechanism associated with that motor and the motor itself becomes jammed or slowed down because of severe overload. This will cause the adjacent bi-metallic strip 326 to interrupt the holding current to realy 321 of the starter, and the particular motor in question will thereby be removed from contact with the three power lines 300, 301 and 302. This removal of contact from power line 301 will result in removal of the holding circuit to the next higher numbered starter, and will cause the starter to open dropping its associated motor off of the line. This, of course, continues progressively until all of the motors "ahead" of the overloaded or jammed motor stop.

As previously suggested, when it is desired that the apparatus be put into operation, motor starters 303 through 312 are activated in sequence running from the lowest number to the highest. This is done by pushing the "Push To Start" switches 323 of each motor starter in sequence.

The push button controls for all of the motor starters are housed in a control box 230. On a first door 231 of this box, the controls for diesel engine 26 are also positioned. On a second door 232 of the box 230, all of the "Push To Start" switches 323 and the "Push To Stop" switches 320 are positioned as indicated at 233.

In addition to these switches, the second door 232 contains indicator lights 234 which are wired through suitable bin level indicators 235 to indicate when the grain and hay bins are full and when they are empty. The bin level indicators will be of any usual or preferred construction.

*Operation of pellet mill apparatus*

When the pellet mill apparatus is to be used, the feed supplement hoppers are filled with suitable feed supplements, the steam generator 130 and the diesel engine 26 are started. If the grain and hay bins are empty, before continuous processing operation is commenced, the hammermill 41 will be started by engaging cluch 29 and the hay or grain to be processed will be loaded onto the conveyor 44 and delivered into the hammermill where it will be processed. The material will then be blown up through pipe 46 in direction indicated by arrow 52 into the cyclone dust collector 47 and diverted to the proper storage bin through provided conveyor pipes. When a sufficient amount of chopped hay and grain is in the storage bins, the pellet mill assembly 119 will be started by engaging clutch 127.

It should be noted that during operation of the pellet mill, more hay and grain will be chopped as needed in order to keep the bins sufficiently full to provide for continuous operation.

The electric motors will then be started in sequence for the pellet cooler, the pellet conveyors and all of the feeding and mixing motors as well as the motors for the line shaft and hay and grain bin screw conveyors. As previously explained, the settings for the ratchet type feeders will be established to yield delivery of the desired ratio of ration ingredients.

Continuous processing can now be commenced by engaging the dog type clutches for the supplement and wing-type feeders. Material will flow from the feed supplement hoppers and from the grain and hay bins into the collector screw conveyor housing 93 in predetermined proportions and will be moved by the screw conveyor 94 in direction as indicated by 104 toward the vertical screw conveyor 110. It will then be elevated up the vertical screw conveyor housing 110 and will then be transported through the horizontal screw conveyor housing 114 by the horizontal screw conveyor 115.

The material to be pelleted will be emptied into the surge hopper 118 and from there will be fed into the pellet mill feeder unit 128. From the feeder unit, material moves into the mixer unit 129 of the pellet mill. In the mixer unit, a large auger mixes the feed, and will also mix in steam that is injected in to the pellet mill at this point. In addition, in most cases molasses will be pumped into the mixer unit by the molasses pump and mixes with the feed mixture. The control of molasses and steam, in the form of the invention as disclosed, is manual. The amounts of these constituents is varied as necessary to provide the proper binding and moisture by watching the character of the pellets being discharged from the pellet mill assembly 119.

The mixed material moves from the mixer unit into the pellet mill housing 125 where it will be forced through the forming die in the usual manner. The resulting finished pellets will be dropped out onto the first belt conveyor 140 and will be moved from there to a second belt conveyor 141 and transported over to the foot of a bucket-type elevator 143. Bucket-type elevator 143 will elevate the hot pellets upwardly and will dump them into chute 148 which in turn will direct them to the mesh belts 154 and 166 in the pellet cooling mechanism. The pellet cooling fan will pull air across and through these belts and will thus cool the pellets as they are transported through the pellet cooling mechanism. The finished pellets will then be discharged out through the pellet discharge chute 169 and from there transported to their desired location for storage or use.

As indicated on the flow chart of FIG. 13, the operations of keeping filled the hay bin 58, the grain bin 71, and the four feed supplement bins 83 are of a batch feeding nature; and the process of the invention and the instrumentalities associated with that process can be referred to as the "Batch Feed Section." The entire remainder of the process of the invention and the instrumentalities associated therewith are of a continuous flow nature, and this portion of the process and these instrumentalities can be referred to as the "Continuous Flow Section."

This continuous flow process from storage bins to cold pellets represents the ultimate in the efficient use of the various components of the apparatus. In other words, by keeping the pellet mill 125 and other components continuously in operation, maximum production is achieved.

Further, as long as the process is being continuously performed, there is no lost production because of poor or imperfect pellets which may be formed as the operation comes to a halt and starts up again.

Also, obtaining optimum results depends upon proper adjustment of feed of hot molasses and steam to the mixer unit. Each time the process is instituted, there will necessarily be a period when proper and final adjustments of the rate of molasses and steam feed to the mixer unit are being determined. During this period there may be produced pellets which are not of optimum qualtity. By operating the process continuously, this adjustment period need not be repeated once the process is in operation.

Continuous operation of the apparatus of the invention is made possible by the adjustment of the ratchet drive assemblies 102 of the food supplement bins 83 and of the chain and sprocket drives 91 which drive the wing-type feeder elements 90 of the hay bin 58 and the grain bin 71. As previously explained, these drives 102 and 91 and the collector screw conveyor 94 all receive their motivation from drive motor 87. Once these drives 102 and 91 are adjusted to deliver the proper relative amounts of food ration to collector screw conveyor 94, simultaneous motivation of this screw conveyor and all six of the drive mechanisms insures that the proper ration will be leaving the collector screw conveyor 94 and, after being handled by the intervening conveyors, arriving at the surge hopper 118.

A drive motor 87 will drive the collector screw conveyor 94 and the other associated conveyors and feed mechanisms at such a speed as to approximate the rate at which materials are handled through the pellet mill. It is advantageous that the rate of delivery from the collector screw conveyor to surge hopper is exactly the same or slightly greater than the rate at which the pellet mill can utilize the same materials. In the event that too much material arrives in the surge hopper, and the surge hopper starts to get too full, the "Push To Stop" switch 320 of the motor starter 310 will be used to stop operation of the drive motor 87. As explained previously, this will also stop motors 76 and 65 which control the grain bin and hay bin augers, respectively.

When sufficient material has been used from the surge hopper, drive motor 87, and motors 76 and 65 will be reactivated again to reinstitute the feed of the metered ration to the surge hopper.

From the surge hopper, the flow of the metered ration materials is through the feeder unit, where it is both fed and further mixed by the feeder unit auger; through the mixer unit where it is further mixed and where steam and molasses are mixed in with the metered dry constituents of the ration; and into the pellet mill where the now fully mixed and metered ration, and steam and molasses mixture are forced through the die openings under pressure to form the pellets.

These pellets are discharged from the pellet mill 125 and flow through the hot pellet conveying mechanism and cooling mechanism 152 to be discharged from the entire apparatus so they can be transported to any desired or desirable location for use or storage.

Apparatus of the present invention is portable in nature. As shown, it is a trailer mounted unit for use with a regular over-the-road semi-trailer tractor unit. In some instances, the invention could be entirely truck mounted. It is to be understood that without the Continuous Flow Section of the present invention, much larger storage bin volumes would be required, a batch mixer and batch storage hopper would be required, and the entire apparatus would then be so heavy, large, and cumbersome, that it could not be part of a portable unit.

The portable unit of the present invention will utilize the maximum output possible from the particular size of standard pellet mill chosen. A big factor in the economics of pelleting hay and grain and other constituents into livestock feed is the lower cost of handling and transporting the condensed balanced ration pellets as opposed to the cost of handling and transporting the unprocessed hay and grain and other constituents. Because the portable pellet mill apparatus of the present invention can be moved to geographical position adjacent the source of the hay and grain, the transportation cost for these bulky unprocessed materials can be kept way down or virtually eliminated. Pelleted feeds which are not going to be used in the immediate location of their manufacture can be much more efficiently transported over the road to their locations for use.

Another cost saving involving transportation grows out of the fact that pelleted feeds as made by the apparatus and process of the present invention are very often used in closed proximity to the source of unprocessed hay and grain. By using the portable pelleting apparatus of the present invention at position close to the source and close to the location for ultimate consumption of the feed, an absolute saving in transportation costs of the raw materials and the processed pellets is obtained.

In order to utilize the capital investment in a pelleting mill apparatus efficiently, it is necessary that the apparatus be utilized each season that the raw materials become available. Because the apparatus of the present invention is portable, it can be transported over the road to geographical positions close to the best source of raw materials. In this manner, the apparatus of the invention can be efficiently used every year whether or not there are crop failures in its usual area of use.

What is claimed is:

1. A portable pellet mill apparatus including a trailer, a prime mover on said trailer, a pellet forming mill on said trailer, a first hot pellet belt conveyor on said trailer and situated to receive newly formed pellets from said pellet forming mill, a second hot pellet belt conveyor on said trailer and situated to receive pellets from said first hot pellet belt conveyor, a bucket elevator on said trailer and situated to receive pellets from said second hot pellet belt conveyor, a third pellet cooling conveying belt on said trailer, means for cooling pellets on said pellet cooling conveyor belt including an exhaust air fan on said trailer, a pellet mill mixer unit supported on said trailer for mixing feed, steam and molasses and conveying the mixture to said pellet forming mill, a source of steam and a source of hot molasses on said trailer, manually operable means for supplying steam and molasses from said sources to the interior of said mixer unit, a pellet mill feeder unit supported on said trailer situated to discharge into said pellet mill mixer unit for conveying said feed into said unit, a surge hopper adapted to discharge feed into said pellet mill feeder unit, collector means supported on said trailer and situated to convey feed to said surge hopper, a hay bin, a grain bin and a plurality of feed supplement bins mounted on said trailer, a hay bin conveyor for conveying commutated hay from said hay bin, a grain bin conveyor for conveying grain from said grain bin, a plurality of adjustable means supported on said platform each for conveying feed from one of said hay bin conveyors, grain bin conveyor and feed supplement bins, first power means to drive said pellet cooling conveyor belt, first disabling means to manually disable said first power means, second power means to drive said exhaust air fan, second disabling means operative upon disability of said first power means to disable said second power means, third power means to drive said bucket elevator, third disabling means operative upon disability of said second power means to disable said third power means, fourth power means to drive said second hot pellet belt conveyor, fourth disabling means operative upon disability of said third power means to disable said fourth power means, fifth power means to drive said first hot pellet belt conveyor, fifth disabling means operative upon disability of said fourth power means to disable said fifth power means, drive means operably connecting said prime mover to drive said pellet forming mill, said drive means including an overload device operative to disconnect said pellet forming mill from said prime mover upon overload of said mill, sixth power means operative to drive said pellet mill mixer unit, sixth disabling means to disable said sixth power means upon disability of said fifth power means, seventh disabling means to disable said sixth power means upon operation of said overload device, seventh power means to drive said pellet mill feeder unit, eighth disabling means to disable said seventh power means upon disability of said sixth power means, eighth power means to simultaneously drive all of said adjustable means, ninth disabling means operative to disable said eighth power means upon disability of said seventh power means, ninth power means to drive said grain bin conveyor, tenth disabling means to disable said ninth power means upon disability of said eighth power means, tenth power means to drive said hay bin conveyor, and eleventh disabling means to disable said tenth power means upon disability of said ninth power means.

2. The combination as specified in claim 1 and manual means to disable said eighth power means and consequently said ninth and tenth power means to interrupt the drive of said adjustable means and said grain bin and hay bin conveyors.

3. The combination as specified in claim 1, a generator operably connected to said prime mover to be driven thereby, wherein said first through tenth power means are each constituted as a separate electric motor, separate manually operable motor-starter mechanisms for connecting each of said motors electrically to said generator, and wherein said first through eleventh disabling means are each operative to interrupt the flow of power from said generator to its associated motor.

4. The combination as specified in claim 3, control means for permitting said motors to be energized only sequentially from one through ten, said control means including a motor starter power connection from each said motor-starter mechanism of each motor to the next lower numbered motor and including a motor-starter power connection from said first power means motor through a manually operable switch to said generator.

5. The combination as in claim 3, a hammermill, releasable drive means for operably connecting said prime mover to said hammermill, and means for conveying comminuted feed from said hammermill selectively to said hay bin and said grain bin.

(References on following page)

References Cited by the Examiner

UNITED STATES PATENTS

| | | | |
|---|---|---|---|
| 1,825,475 | 9/31 | Pfeiffer | 18—12 |
| 1,960,548 | 5/34 | Pfeiffer | 107—54 |
| 2,065,141 | 12/36 | Meakin | 107—54 |
| 2,257,062 | 9/41 | Morrow | 192—116.5 |
| 2,651,269 | 9/53 | French | 107/4 |
| 2,772,642 | 12/56 | Lindl | 107—4 |
| 2,965,265 | 12/60 | Schuerger et al. | 222—57 X |
| 3,051,219 | 8/62 | Kaiser | 25—99 X |

OTHER REFERENCES

"Pelleting" (TS–2158–P4—1959), pages 17, 18 and 133.

WALTER A. SCHEEL, *Primary Examiner.*

J. D. SEERS, *Examiner.*

UNITED STATES PATENT OFFICE
CERTIFICATE OF CORRECTION

Patent No. 3,181,482

May 4, 19(

Arthur M. Heth et al.

It is hereby certified that error appears in the above numbered patent requiring correction and that the said Letters Patent should read as corrected below.

Column 3, line 34, for "reducr" read -- reducer --; column 4, line 48, for "is" read -- it --; column 5, line 20, after "power" insert -- shaft --; line 28, for "feed" read -- fed --; column 8, line 50, for "adjutable" read -- adjustable --; column 10, line 59, strike out "one"; line 67, for "realy" read -- relay --; column 11, line 26, for "cluch" read -- clutch --.

Signed and sealed this 12th day of October 1965.

(SEAL)
Attest:

ERNEST W. SWIDER
Attesting Officer

EDWARD J. BRENNER
Commissioner of Patents